United States Patent
Grois et al.

(10) Patent No.: US 12,335,538 B2
(45) Date of Patent: *Jun. 17, 2025

(54) SYSTEMS, METHODS, AND APPARATUSES FOR PROCESSING VIDEO

(71) Applicant: Comcast Cable Communications, LLC, Philadelphia, PA (US)

(72) Inventors: Dan Grois, Beer-Sheva (IL); Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,560

(22) Filed: Sep. 21, 2023

(65) Prior Publication Data

US 2024/0015338 A1 Jan. 11, 2024

Related U.S. Application Data

(63) Continuation of application No. 17/661,653, filed on May 2, 2022, now Pat. No. 11,792,439, which is a
(Continued)

(51) Int. Cl.
*H04N 19/86* (2014.01)
*H04N 19/119* (2014.01)
(Continued)

(52) U.S. Cl.
CPC ......... *H04N 19/865* (2014.11); *H04N 19/119* (2014.11); *H04N 19/14* (2014.11); *H04N 19/172* (2014.11); *H04N 19/96* (2014.11)

(58) Field of Classification Search
CPC .... H04N 19/117; H04N 19/119; H04N 19/14; H04N 19/157; H04N 19/172;
(Continued)

(56) References Cited

U.S. PATENT DOCUMENTS 9,077,989 B2 7/2015 Sato
2012/0152827 A1 6/2012 Allard
(Continued)

FOREIGN PATENT DOCUMENTS

WO 2012/154847 A1 11/2012
WO 2013/012479 A1 1/2013

OTHER PUBLICATIONS

Chen J et al: "Algorithm description for Versatile Video Coding and Test Model 2 (VTM 2)", 11. JVET Meeting; Jul. 11, 2018-Jul. 18, 2019; Ljubljana; (The Joint Video Exploration Team of ISO/I EC JTC1/SC29/WG11 and ITU-T SG.16 ), No. JVET-K1002 Sep. 30, 2018 (Sep. 30, 2018), XP030194056, Retrieved from the Internet: URL:http://phenix.int-evry.fr/jvet/doc_end user/documents/11 Ljubljana/wg11/JVET-KIO 02-v2.zip JVET-K1002-v2.docx [retrieved on Sep. 30, 2018].
(Continued)

*Primary Examiner* — Maria E Vazquez Colon
(74) *Attorney, Agent, or Firm* — BakerHostetler

(57) ABSTRACT

Systems, methods, and apparatuses are described for processing video. A method may comprise receiving video content comprising a plurality of frames and determining a splitting parameter of a partitioning of at least a portion of
(Continued)

a first frame of the plurality of frames. Deblock filtering may be implemented on at least the first frame of the plurality of frames based at least on the splitting parameter.

30 Claims, 5 Drawing Sheets

Related U.S. Application Data continuation of application No. 16/590,815, filed on Oct. 2, 2019, now Pat. No. 11,363,303.

(60) Provisional application No. 62/740,369, filed on Oct. 2, 2018.

(51) Int. Cl.
*H04N 19/14* (2014.01)
*H04N 19/172* (2014.01)
*H04N 19/96* (2014.01)

(58) Field of Classification Search
CPC .... H04N 19/176; H04N 19/82; H04N 19/865; H04N 19/96
See application file for complete search history.

(56) References Cited

U.S. PATENT DOCUMENTS

| | | |
|---|---|---|
| 2012/0287994 A1 | 11/2012 | Van et al. |
| 2015/0350687 A1* | 12/2015 | Zhai ........................ H04N 19/82 |
| | | 375/240.25 |
| 2015/0365666 A1 | 12/2015 | Dong et al. |
| 2017/0208336 A1* | 7/2017 | Li ........................ H04N 19/176 |
| 2018/0176601 A1 | 6/2018 | Jeong et al. |
| 2019/0104315 A1* | 4/2019 | Guo ...................... H04N 19/172 |
| 2020/0275117 A1 | 8/2020 | Jeong et al. |
| 2021/0152827 A1* | 5/2021 | Park ........................ H04N 19/86 |
| 2021/0154827 A1 | 5/2021 | Kim |

OTHER PUBLICATIONS

US Patent Application filed on May 2, 2022, entitled "Systems, Methods, and Apparatuses for Processing Video", U.S. Appl. No. 17/661,653.

US Patent Application filed on Oct. 2, 2019, entitled "Systems, Methods, And Apparatuses For Processing Video", U.S. Appl. No. 16/590,815.

* cited by examiner

SYSTEMS, METHODS, AND APPARATUSES FOR PROCESSING VIDEO

CROSS-REFERENCE TO RELATED APPLICATIONS

This application is a continuation of U.S. application Ser. No. 17/661,653, filed May 2, 2022, now U.S. Pat. No. 11,792,439, issued Oct. 17, 2023, which is a continuation of U.S. application Ser. No. 16/590,815, filed Oct. 2, 2019, now U.S. Pat. No. 11,363,303, issued Jun. 14, 2022, which claims priority to U.S. Provisional Application No. 62/740,369, filed Oct. 2, 2018, entitled "Systems, Methods, And Apparatuses For Processing Video," the entireties of which are incorporated herein by reference.

BACKGROUND

Video content is being created with ever-increasing resolution and contrast levels. For example, UltraHD video may include resolutions of 4K or even 8K. As another example, High Dynamic Range (HDR) allows for presentation of highly bright as well as very dark signals on the same video frame, thereby providing a high contrast ratio within the same image. However, such high-quality video presents challenges regarding the computational resources for encoding, processing, and/or decoding, storage space requirements, and bandwidth requirements to deliver such video content to consumers. As such, improvements are needed.

SUMMARY

Systems, methods, and apparatuses are described for processing video. A method may comprise receiving video content comprising a plurality of frames and determining a splitting parameter of a partitioning of at least a portion of a first frame of the plurality of frames. Deblock filtering may be implemented on at least the first frame of the plurality of frames based at least on the splitting parameter.

BRIEF DESCRIPTION OF THE DRAWINGS

The following drawings show generally, by way of example, but not by way of limitation, various examples discussed in the present disclosure. In the drawings.

DETAILED DESCRIPTION

Systems, methods, and apparatuses are described for processing (e.g., preprocessing, coding, pre-filtering, partitioning, etc.) video data. Systems, methods, and apparatuses are described for processing video. A method may comprise receiving video content comprising a plurality of frames and determining a splitting parameter of a partitioning of at least a portion of a first frame of the plurality of frames. Deblock filtering may be implemented on at least the first frame of the plurality of frames based at least on the splitting parameter.

Such techniques may reduce the size of the compressed video, saving on storage and bandwidth.

Figure 1:
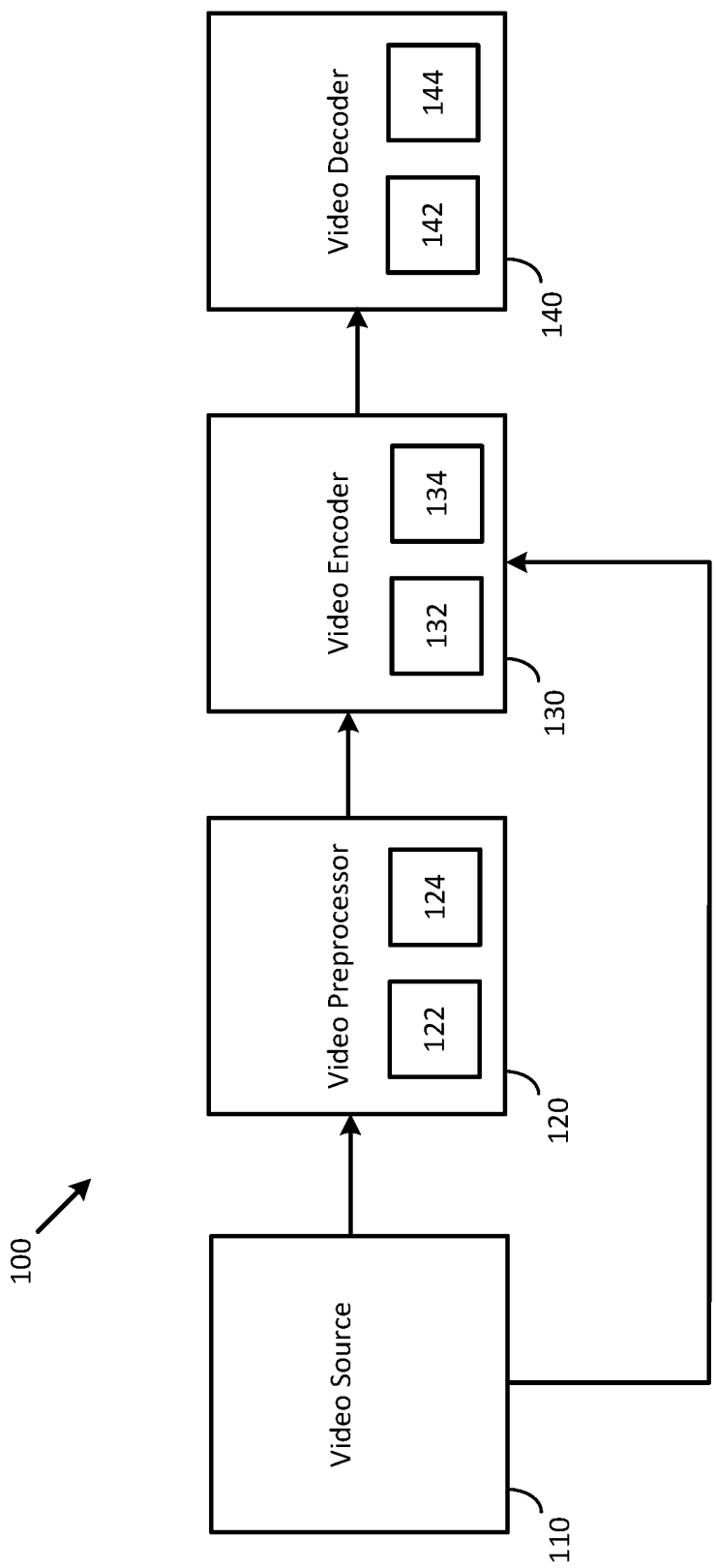
FIG. 1 is a block diagram of a video processing system.

FIG. 1 shows a block diagram of an example video distribution system 100. The video distribution system 100 may comprise a video source 110, a video preprocessor 120, a video encoder 130, and a video decoder 140. The video source 110 may provide raw, uncompressed video data, comprising video content, to the video preprocessor 120 and/or the video encoder 130. The video preprocessor 120 may process the raw video data and send the preprocessed video data to the video encoder 130. The video encoder 130 may receive the raw video data and/or the preprocessed video data, as the case may be, and encode such video data. The encoded video data may be sent to the video decoder 140. The video decoder 140 may decode the encoded video data. The decoded video data, comprising the video content, may be presented to a viewer.

The video source 110 may provide video (e.g., audio and/or visual) content in response to a request. The request may be from a user device, such as a mobile device, a set-top box, a cable modem, etc. The request may be from a schedule (such as a network's programming schedule, for example), which automatically requests video content related to a particular program at a particular time. The video content may comprise a plurality of frames. The video source 110 may be video storage, such as from a video-on-demand database. The video source 110 may be a video stream, such as a live feed from a camera. The video content provided from the video source 110 may be raw (e.g., uncompressed, unprocessed, not encoded, etc.) video.

The video preprocessor 120 may receive (e.g., intercept, etc.) video data from the video source 110. The video preprocessor 120 may comprise one or more logical blocks of instructions 122, 124 for preprocessing video. The video source 110 and the video preprocessor 120 may be integrated into one or more computing devices. The video source 110 and the video preprocessor 120 may be local to one another (e.g., in the same room, on the same premises, etc.). The video source 110 and the video preprocessor 120 may be remote from one another. The video preprocessor 120 may execute one or more of the one or more logical blocks of instructions 122, 124 to convert received raw video into preprocessed (e.g., coded, etc.) video.

The video preprocessor 120 and/or the video source 110 may transmit (e.g., send, deliver, etc.) the video data (raw or preprocessed) to the video encoder 130. The video encoder 130 may comprise one or more logical blocks of instructions 132, 134 for encoding video data. The video encoder 130 may treat the received video data as input. The video encoder 130 may execute one or more of the one or more logical blocks of instructions 132, 134 to convert received raw video data and/or preprocessed video data into encoded (e.g., compressed, etc.) video data.

The video encoder 130 may encode the video data according to a number of video coding formats, such as MPEG-2 Part 2, MPEG-4 Part 2, H.264 (MPEG-4 Part 10), or H.265 (HEVC). The video encoder 130 may further encode the video data according to any future or developing video coding format. For example, the video encoder 130 may encode the video data according to the emerging Versatile Video Coding (VVC) standard. The aforementioned video formats, or others, may also apply to decoding or other processes. The video data may be organized as a series of frames. The series of frames may comprise I-, B-, and P-frames. Each frame may be divided into a number of partitions. Each partition may comprise a plurality of pixels. Depending on the coding format, the partition may be a block, macroblock, coding tree unit, etc. A partition may comprise an 8×8 block of image values. A partition may comprise any other size block of image values. An image value of a partition may represent a pixel. A partition may be with respect to luma (Y) or one of the two chroma components (Cr (U), Cb (V)). The image values of a partition may indicate a luminance component or one of the two chrominance components of the respective pixel of the partition.

Figure 2:
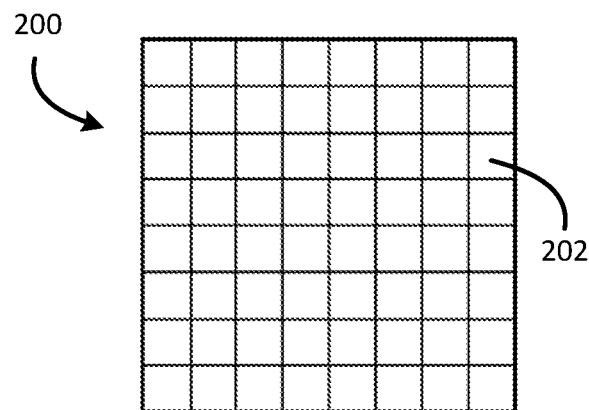
FIG. 2 is a representation of a coding tree unit (CTU).

In the case of the VVC standard being used, the video data may be encoded using a quadtree structure with a nested multi-type tree. The quadtree may comprise a binary and ternary splits segmentation structure. FIG. 2 depicts a coding tree unit (CTU) 200 showing an example division of the CTU 200. The CTU 200 may be used in conjunction with the VVC standard. The CTU 200 may comprise a plurality of partitions 202. A partition may comprise a CU. According to the VVC standard, a coding unit (CU) may be in a square shape or a rectangular shape. Further according to the VVC standard, the CTU 200 may comprise a maximum size of 128×128 pixels. For example, a maximum size of a luma block in the CTU 200 may be 128×128 pixels. A maximum size of a luma transform block (TB) may be 64×64 pixels, which may be well suited for higher resolution videos. The supported chroma TB size may be 32×32 pixels under the VVC standard.

A CTU may be partitioned by a quaternary tree comprising leaf nodes. The quaternary tree leaf nodes may be further partitioned (e.g., split) by a VVC multi-type tree (MTT) structure. The VVC standard may include several different splitting types. For example, the VVC standard may include a vertical binary splitting type, horizontal binary splitting type, a vertical ternary splitting type, and a horizontal ternary splitting type.

Figure 3:
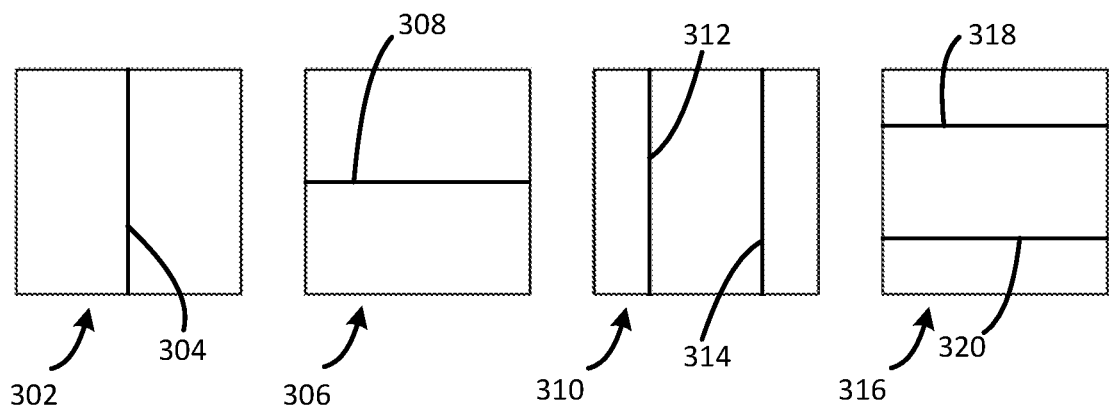
FIG. 3 is a representation of various splitting types available under the VVC standard.

FIG. 3 depicts various splitting types available under the VVC standard. For example, a vertical binary splitting type is represented in CU 302, which comprises a binary tree vertical split 304. A horizontal binary splitting type is represented in CU 306, which comprises a binary tree horizontal split 308. A vertical ternary splitting type is represented in CU 310, which comprises a first ternary tree vertical split 312 and a second ternary tree vertical split 314. A horizontal ternary splitting type is represented in CU 316, which comprises a first ternary tree horizontal split 318 and a second ternary tree horizontal split 320.

The leaf nodes of the VVC standard may each comprise a CU. The leaf nodes and/or associated CUs may be used for prediction and transform processes without additional splitting/partitioning. However, if the CU size is too large compared to a preset maximum length (e.g., 64×64 pixels), the CU may be not used for prediction and transform processes without additional splitting/partitioning. A quadtree having the nested multi-type tree coding block structure, the CUs, prediction units (PUs), and transform units (TUs) may have the same block size. Yet if the supported transform length is smaller than the width and/or height of the CU color component, the CUs, PUs, and TUs may be configured in unequal or same sizes.

The VVC quadtree with nested multi-type tree partitioning structure may comprise a CU-based content adaptive coding tree structure. The size of each CU may be the same or smaller than the CTU size. For luma samples, the size of each CU may be up to 4×4 pixels. A maximum supported luma transform block (TB) size may be 64×64 pixels. A maximum supported chroma TB size may be 32×32 pixels. A coding block (CB) may be split when the width and/or height of the CB is larger than a maximum transform width and/or height, such as when needed to meet a TB size limitation.

Figure 4:
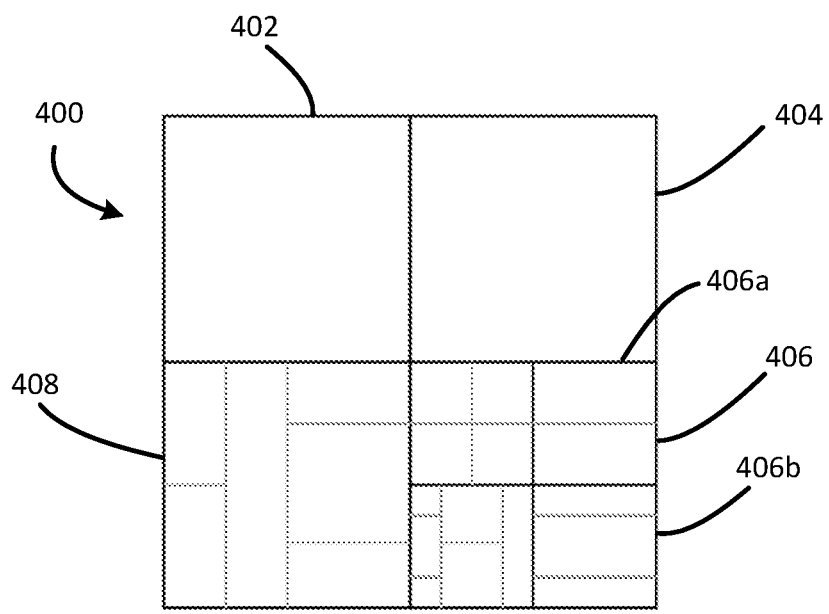
FIG. 4 is a representation of a CTU.

A CTU may be split into multiple CUs, thereby forming a quaternary tree with nested MMT coding block structure. FIG. 4 depicts a CTU 400. The CTU 400 is split into multiple CUs. Particularly, the CTU 400 is split into four equal CUs: upper left CU 402, upper right CU 404, lower right CU 406, and lower left CU 408. It is noted that a sub-partition 406a of the lower right CU 406 is split according to the horizontal binary splitting type. It is further noted that a second sub-partition 406b of the lower right CU 406 is split according to the horizontal ternary splitting type.

The splitting may be done as part of or in conjunction with the encoding the video data. For example, the splitting (and other noted processes relating to the VVC standard) may be performed by the video encoder 130. The splitting may be performed as part of the encoding process, for example, to adapt to various local characteristics, such as the complexity or texture of the image or portion thereof.

The video encoder 130 may perform deblocking filtering with respect to the video data. As numerous video encoding formats and processes include various forms of partitioning, undesirable blocking artifacts (e.g., "blockiness") may appear at block boundaries in the resultant video data. For example, there may be no correlation between the blocks and discontinuities on the block edges. Such blocking artifacts may be perceivable by the human visual system (HVS). This may particularly occur when the video data comprises relatively smooth (e.g., flat) content. In particular, blocking artifacts may occur due to the application of block-transform coding on the prediction error and then performing relatively course quantization (e.g., with a relatively high quantization parameter (QP)).

The deblocking filtering may be performed to reduce such blocking artifacts. The deblocking filtering may improve objective and/or subjective picture quality of the encoded video data. For example, the deblocking filtering may enhance continuity between block boundaries (e.g., borders and/or edges). The deblocking filtering may be performed as part of or in conjunction with the encoding process. For example, the deblocking filtering may be applied to the video data having already undergone the splitting processes associated with the VVC standard.

The deblocking filtering may comprise in-loop filtering during the encoding process. For example, the deblocking filtering may be applied to a reconstructed images (e.g., reference frames or images) during the encoding process. Deblocking filtering applied to reconstructed frames or images may improve coding efficiency, which, in turn, may result in reductions in the bit-rate of the encoded video data. Further, deblocking filtering may force the decoders to perform standardized filtering decisions/operations for staying synchronized with the encoder. The requirement of the in-loop filtering may aid in achieving a certain level of video quality, which can be highly important where decoders of several manufactures are used to decode video content, thereby ensuring a predefined quality level as expected by the video content producer.

The deblocking filtering applied by the video encoder 130 (or other component) to the video data may comprise adaptive deblocking filtering in which the deblocking filtering is based on splitting parameters associated with the splitting of a portion of an image or frame of video data. Such splitting parameters may comprise the complexity of the portion of the frame, the texture of the portion of the frame, a quantity of splits of the portion of the frame, and/or a splitting type (e.g., a vertical binary splitting type, a horizontal binary splitting type, a vertical ternary splitting, and/or a horizontal ternary splitting type) of one or more splits of the portion of the frame.

The strength of the deblocking filtering may be based on the splitting parameters. The strength of the deblocking filtering may tend to be inversely proportionate to the complexity of portion of the frame and/or a quantity of splits. That is, a higher strength of deblocking filtering may tend to be based on a lower complexity of a portion of a frame and/or a lesser quantity of splits of the portion of the frame. Conversely, a lower strength of deblocking filtering may tend to be based on a higher complexity of a portion of a frame and/or a greater quantity of splits of the portion of the frame.

Additionally or alternatively, adaptive deblocking filtering may be based on a directionality of one or more splits in the portion of the frame. The border regions to which deblocking filtering is applied may be based on the directionality of the splits in the portion of the frame. The decision whether to apply adaptive deblocking filtering to a horizontal and/or vertical border of non-overlapping regions (such as regions of 8×8) may be made based on a particular splitting type (i.e. a vertical binary splitting, horizontal binary splitting, vertical ternary splitting, and/or horizontal ternary splitting), which is carried out at a corresponding CU. For example, at CU regions with either vertical binary splitting and/or vertical ternary splitting, a vertical border of predefined non-overlapping regions may be deblocked while deblocking filtering to one or more associated horizontal borders may be omitted.

One or more splitting parameters (e.g., complexity, texture, quantity of splits, type of splits, directionality of splits, directionality of border regions) may be indicated to a deblocking filtering component. Such deblocking filtering component may be integrated with the video encoder 130 or situated (physically or logically) apart from the video encoder 130. The splitting parameter indication may be realized as metadata associated with the video data or as a separate message. The message may comprise an intra-encoder message between various components of the video encoder 130, including a deblocking filtering component. The metadata may be recognized by various components of the video encoder 130 to effectuate communication of the splitting parameters within the video encoder 130.

Such adaptive deblocking filtering techniques may improve the perceived video quality of video data having undergone the adaptive deblocking filtering. Such adaptive deblocking filtering techniques may remove or lessen the need to apply post-processing (e.g., post-encoding) deblocking filtering, although the application is not so limited. Performing the adaptive deblocking filtering process may allow the omission or reduction of post-processing deblocking filtering.

The video encoder 130 may send the video to a device requesting the video content. The video encoder 130 and one or more of the video source 110 and the video preprocessor 120 may be integrated into one or more computing devices. The video preprocessor 120 and the video encoder 130 may be local to one another (e.g., in the same room, on the same premises, etc.). The video preprocessor 120 and the video encoder 130 may be remote from one another.

The video encoder 130 may send the encoded video data to the video decoder 140 in a video stream. The video decoder 140 may comprise one or more logical blocks of instructions 142, 144 for decoding video. The video decoder 140 may be realized as a user device or component thereof. The video decoder 140 may receive the encoded video data from the video encoder 130. The video decoder 140 may execute one or more of the one or more logical blocks of instructions 142, 144 to convert (e.g., decode, etc.) received encoded video data to decoded (e.g., uncompressed, etc.) video data. The video decoder 140 may decompress the encoded video data using an entropy decoder. The video decoder 140 may perform an inverse transform based on quantized transform coefficients from the video stream, thus determining a decoded image representing the original partition. The decoded image is likely not an exact replication of the original.

The video decoder 140 may output the decoded video data. The output decoded video data may be presented to a viewer, such as via the user device and/or a display associated with the user device. Although the systems, methods, and apparatuses described herein are generally described in reference to the video encoder 130, it is understood that various other components of the system 100 may perform, at a preprocessing stage, some or all of the disclosed techniques for adaptive deblocking filtering.

Referring again to FIG. 4, the CTU 400 may represent a frame of video data. The upper left CU 402 and the upper right CU 404 may form a portion of the frame that comprises flat video content, such as a blue sky. The lack of partitioning or splitting of the upper left CU 402 and the upper right CU 404 may reflect the flat nature of that portion of the frame. Yet the lower right CU 406 and the lower left CU 408 may form a portion of the frame that comprises more complex or textured video content, such as a ground portion of the video content with various individuals, vehicles, structures, or the like. As such, the lower right CU 406 and the lower left CU 408 comprise various partitions or splits. The lower right CU 406 may represent more complex or textured video content than the lower left CU 408, as reflected in the greater quantity of partitions or splits found in the lower right CU 406.

Adaptive deblocking filtering may be applied to the CTU 400. The adaptive deblocking filtering applied to the CTU 400 may be based on a splitting parameter of the CTU 400. Additionally or alternatively, the adaptive deblocking filtering may be applied separately to one or more of the CU 402, CU 404, CU 406, and CU 408.

The adaptive deblocking filtering may be applied to the upper left CU 402 based on a complexity and/or quantity of splits of the CU 402 (e.g., the complexity of the corresponding video content). The adaptive deblocking filtering may be additionally or alternatively applied to the upper right CU 404. It was noted that the CU 402 and CU 404 comprise flat video content, such as a blue sky. Due to the reduced complexity and/or lack of splits in the CU 402 and the CU 404, a stronger deblocking filtering may be applied to the CU 402 and the CU 404.

The adaptive deblocking filtering may be applied to the lower right CU 406 and the lower left CU 408. The lower CU 406 and CU 408 both have greater complexity than the upper CU 402 and CU 404. The lower CU 406 and CU 408 likewise each have greater quantities of splits than both of the upper CU 402 and CU 404. Based on the greater complexity and/or greater quantity of splits found in the lower CU 406 and CU 408, the adaptive deblocking filtering may be applied to the lower CU 406 and CU 408 at a lesser strength than the ad deblocking filtering applied to the upper CU 402 and CU 404. Yet between the CU 406 and the CU 408, the CU 406 comprises a greater quantity of splits and/or more complexity (it is assumed) than the CU 408. Based on the greater complexity and/or greater quantity of splits found in the CU 406, the adaptive deblocking filtering may be applied to the CU 406 at a lesser strength than the adaptive deblocking filtering applied to the CU 408.

The adaptive deblocking filtering applied to the CTU 400 may be based on the splitting type of splits of a CU and/or a directionality of the splits of a CU. The adaptive deblocking filtering may be applied to the CU 406, in particular the lower right sub-partition 406b of the CU 406. The splits in the sub-partition 406b comprise horizontal ternary splitting type splits. The ad deblocking filtering applied to the sub-partition 406b may be based on the splits in the sub-partition 406b comprising horizontal ternary splitting type splits. Additionally or alternatively, the adaptive deblocking filtering applied to the sub-partition 406b may be based on the directionality of the splits of the sub-partition 406b. The directionality of the splits of the sub-partition 406a are horizontal. The ad deblocking filtering applied to the sub-partition 406b may be based on the horizontal directionality of the splits of the sub-partition 406b.

The adaptive deblocking filtering may be applied to sub-partition 406a and the sub-partition 406b. Whether to apply the deblocking filtering to the border region between the sub-partition 406a and the sub-partition 406b may be based on the directionality (e.g., the splitting types, being vertical or horizontal splitting types) of the splits of the sub-partition 406a and the splits of the sub-partition 406b. If the directionality of the splits of the sub-partition 406a and the splits of the sub-partition 406b align, the border region between the sub-partition 406a and the sub-partition 406b, having the same directionality as the splits, the adaptive deblocking filtering may be applied to the border region between the sub-partition 406a and the sub-partition 406b. Here, the directionality of the splits of both of the sub-partition 406a and the sub-partition 406b are horizontal. Based on the directionality of all of the splits of the sub-partition 406a and the sub-partition 406b being horizontal, the adaptive deblocking filtering may be applied to the border region. Based on the splits of the sub-partition 406a and the sub-partition 406b having a horizontal directionality, a vertical border region associated with the sub-partition 406a and/or the sub-partition 406b may be omitted from adaptive deblocking filtering.

Additionally or alternatively (without reference to FIG. 4), the decision whether to apply adaptive deblocking filtering to a horizontal and/or vertical border of non-overlapping regions (such as regions of 8×8) may be made based on a particular splitting type (i.e. a vertical binary splitting, horizontal binary splitting, vertical ternary splitting, and/or horizontal ternary splitting), which is carried out at a corresponding CU. For example, at CU regions with either vertical binary splitting and/or vertical ternary splitting, only a vertical border of predefined non-overlapping regions may be deblocked. By doing as such, reduction of computational recourses may be realized with little or no impact on perceived visual quality.

Any combination or sub-combination of the video source 110, video preprocessor 120, video encoder 130, and/or video decoder 140 may be located local (e.g., in the same room, same premises, etc.) to one another. The video source 110 may be at a first location, the video encoder 130 (and/or the video preprocessor 120) may be at a second location, and the video decoder 140 may be located at a third location, with the first, second, and third locations being different from one another. The video source 110 and the video encoder 130 may be at a first location and the video decoder 140 may be at a second location. Any combination or sub-combination of the video source 110, video preprocessor 120, video encoder 130, and/or video decoder 140 may be realized as a computing device, such as a user device. The video source 110 and video encoder 130 (and the video preprocessor 120, if so applicable) may be realized as a first computing device (e.g., a first mobile and/or user device, etc.) and the video decoder 140 may be realized as a second, different computing device (e.g., a second mobile and/or user device etc.). The video encoder 130 and video decoder 140 (and/or the video source 110 and video preprocessor 120, as the case may be) may be realized as a unitary computing device. The decoding performed by the video decoder 140 and the encoding performed by the video encoder 130 may be part of a video processing operation acting, at least initially, on raw video data. The video processing operation may ultimately output encoded video data by alternately performing encoding and decoding over several iterations.

A Video-On-Demand (VOD) system may be, at least in part, a video distribution system 100. The VOD system may comprise a VOD server, which may be or may comprise a video source 110. The VOD server may receive a request for video content from a set-top box. The VOD system may comprise a processing unit to receive raw video from the VOD server. The VOD server may transmit raw video related to the received request to the processing unit. The processing unit may be or may comprise a video preprocessor (e.g., the video preprocessor 120) and/or a video encoder (e.g., the video encoder 130). The processing unit may comprise one or more logical blocks of instructions to preprocess received video for easier (e.g., more efficient, faster, etc.) consumption of video by a video encoder. The processing unit may comprise one or more logical blocks of instructions to encode raw and/or preprocessed video data. The processing unit may transmit the processed (e.g., encoded) video to the set-top box. The set-top box may comprise a video decoder (e.g., the video decoder 140). The video decoder may decode the encoded video data. The set-top box may cause output of the resultant decoded video, such as via a display associated with the set-top box.

Figure 5:
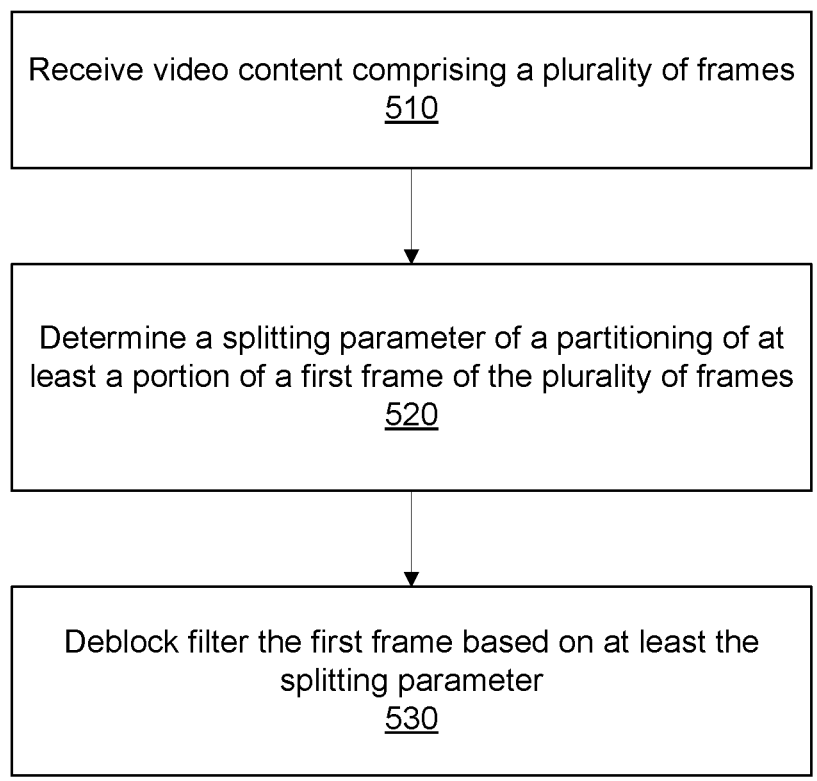
FIG. 5 is a flow diagram of a method.

Referring to FIG. 5, video content comprising a plurality of frames may be received, at step 510. A video encoder (e.g., the video encoder 130 in FIG. 1) may receive the video content comprising the plurality of frames. A deblocking filtering component of the video encoder may receive the video content. The video content may be received during inter-loop deblocking filtering. The video content may comprise un-encoded video content. The video content may comprise high definition video content, such as 4K or 8K resolution video content. The video content may comprise High Dynamic Range (HDR) compressed video content. The video content may comprise Standard Dynamic Range (SDR) compressed video content.

At step 520, a splitting parameter of a partitioning of at least a portion of a first frame of the plurality of frames may be received. The at least a portion of the first frame may comprise a partition of the first frame. The at least a portion of the first frame may comprise a CTU or CU of the first frame. The partitioning may have been performed according to the VVC standard. The partitioning may have been performed during an encoding process of the video content. The partitioning may comprise determining a multi-tree type (MMT) structure. The splitting parameter may indicate a complexity of the at least a portion of the first frame. The splitting parameter may indicate or be based on a texture of the at least a portion of the first frame.

The splitting parameter may indicate a quantity of one or more splits associated with the partitioning of the at least a portion of the first frame. The splitting parameter may indicate a quantity of one or more splits within the at least a portion of the first frame. The one or more splits may comprise one or more splits of a CU of the at least a portion of the first frame. The splitting parameter may indicate a splitting type associated with the partitioning the portion of the first frame. The splitting type may comprise a vertical binary split type, a horizontal binary split type, a vertical ternary split type, and a horizontal ternary split type. The one or more splits may comprise at least one of a vertical binary split, a horizontal binary split, a vertical ternary split, and a horizontal ternary split.

At step 530, the first frame (or the portion thereof) is deblock filtered (i.e., adaptive deblocking filtering is applied) based on at least the splitting parameter. The deblock filtering may be performed as part of the encoding process of the video content. The deblock filtering may be performed at a video encoder. The deblock filtering may comprise determining a strength of the deblock filtering to be applied to the first frame. The strength of the deblock filtering may be inversely proportional to the complexity and/or quantity of splits of the portion of the first frame.

Figure 6:
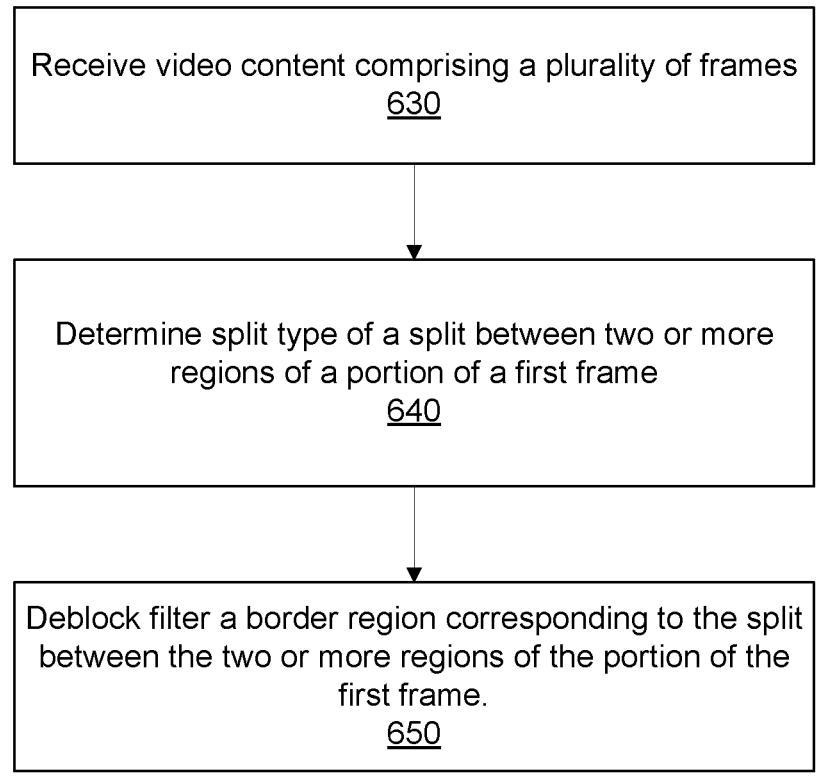
FIG. 6 is a flow diagram of a method.

Referring to FIG. 6, video content comprising a plurality of frames may be received, at step 630. A video encoder (e.g., the video encoder 130 in FIG. 1) may receive the video content comprising the plurality of frames. A deblocking filtering component of the video encoder may receive the video content. The video content may be received during inter-loop deblocking filtering. The video content may comprise un-encoded video content. The video content may comprise high definition video content, such as 4K or 8K resolution video content. The video content may comprise High Dynamic Range (HDR) compressed video content. The video content may comprise Standard Dynamic Range (SDR) compressed video content.

At step 640, a split type of a split between two or more regions of a portion of a first frame of the plurality of frames is determined. The portion of the first frame may comprise a CU. The split type may comprise a vertical split type or a horizontal split type. The split type may comprise a vertical binary split type, a horizontal binary split type, a vertical ternary split type, and a horizontal ternary split type. The one or more splits may comprise at least one of a vertical binary split, a horizontal binary split, a vertical ternary split, and a horizontal ternary split. The one or more splits and or the split type may comprise a directionality (e.g., vertical or horizontal) of the split or split type.

At step 650, a border region corresponding to the split between the two or more regions of the first portion of the first frame is deblock filtered based on the split type. The directionality of the deblock filtering the border region may correspond to the directionality of the split type. The directionality of the deblock filtering the border region may comprise one of a vertical direction and a horizontal direction. The directionality of the split type may comprise one of a vertical direction and a horizontal direction, wherein a split type having a vertical directionality may comprise at least one of a vertical binary split and a vertical ternary split, and wherein a split type having a horizontal directionality may comprise at least one of a horizontal binary split and a horizontal ternary split.

The two or more regions of the first portion of the first frame may comprise all regions of the first portion of the first frame, such that the split types of the splits between adjacent regions of the two or more regions all share a common directionality (e.g., the split types are all vertical or the split types are all horizontal). Based on the split types of the splits between the adjacent regions of the two or more regions, the border regions corresponding to the splits between the adjacent regions of the two or more regions may be deblock filtered. The adjacent regions of the two or more regions may be non-overlapping.

Figure 7:
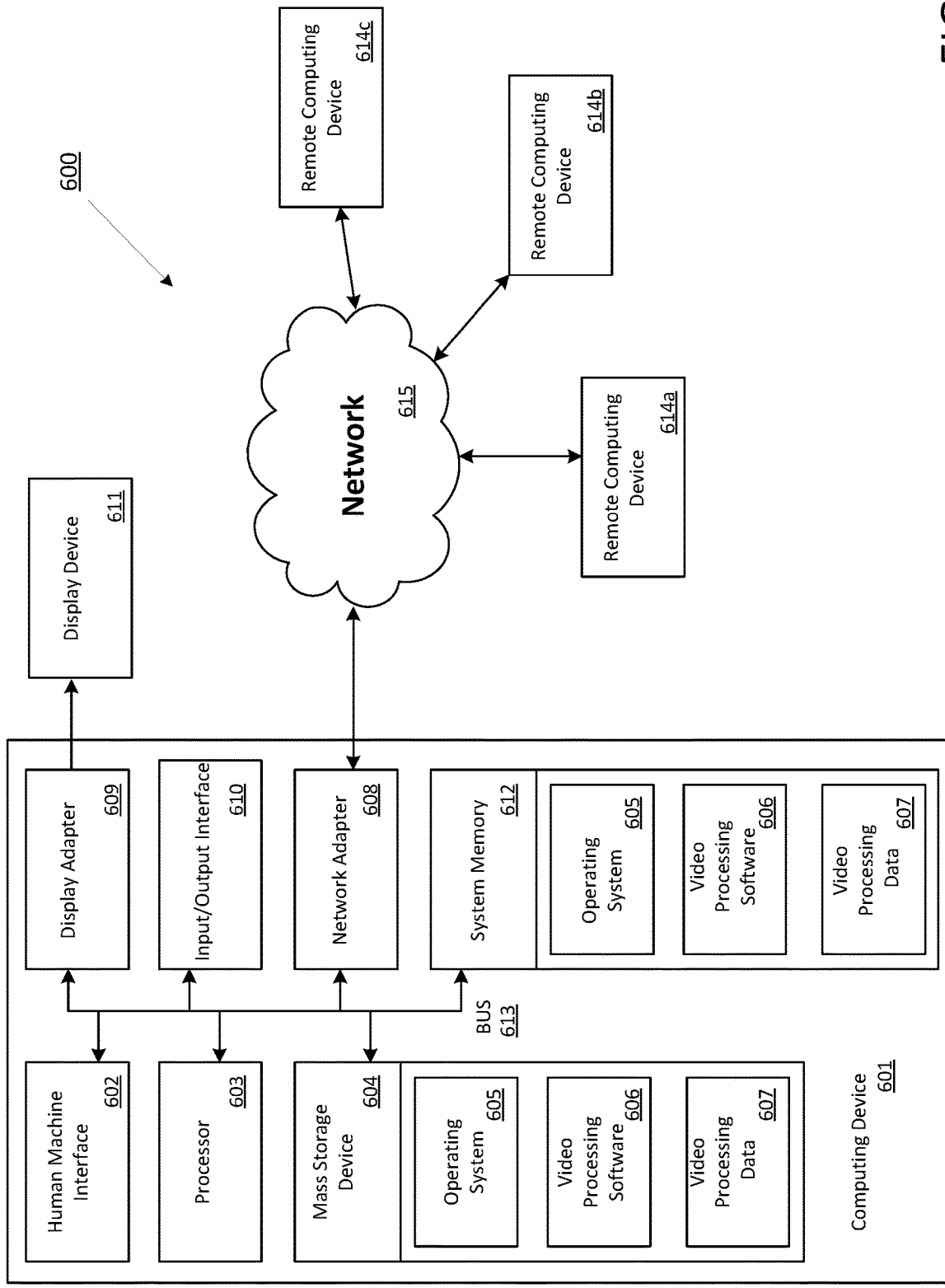
FIG. 7 is a block diagram of a system environment.

FIG. 7 shows an operating environment 600, but is not intended to suggest any limitation as to the scope of use or functionality of operating environment architecture. Neither should the operating environment be interpreted as having any dependency or requirement relating to any one or combination of components shown in the operating environment.

The present methods, systems, and apparatuses may be operational with numerous other general purpose or special purpose computing system environments or configurations. Examples of well-known computing systems, environments, and/or configurations that may be suitable for use with the methods, systems, and apparatuses comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods, systems, and apparatuses may be performed by software components. The disclosed methods, systems, and apparatuses may be described in the general context of computer-executable instructions, such as program modules, being executed by one or more computers or other devices. Generally, program modules comprise computer code, routines, programs, objects, components, data structures, etc. that performs particular tasks or implements particular abstract data types. The disclosed methods may be practiced in grid-based and distributed computing environments where tasks may be performed by remote processing devices that are linked through a communications network. In a distributed computing environment, program modules may be located in both local and remote computer storage media including memory storage devices.

Further, the methods, systems, and apparatuses disclosed may be implemented via a general-purpose computing device in the form of a computing device 601. The components of the computing device 601 may comprise, but are not limited to, one or more processors or processing units 603, a system memory 612, and a system bus 613 that couples various system components including the processor 603 to the system memory 612. In the case of multiple processing units 603, the system may utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 613, and all buses specified in this description may be implemented over a wired or wireless network connection and each of the subsystems, including the processor 603, a mass storage device 604, an operating system 605, video processing software 606, video processing data 607, a network adapter 608, system memory 612, an Input/Output Interface 610, a display adapter 609, a display device 611, and a human machine interface 602, may be contained within one or more remote computing devices 614*a,b,c* at physically separate locations, connected through buses of this form, in effect implementing a fully distributed system.

The computing device 601 typically comprises a variety of computer readable media. Example readable media may be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as video processing data 607 and/or program modules such as operating system 605 and video processing software 606 that are immediately accessible to and/or are presently operated on by the processing unit 603.

The computing device 601 may comprise other removable/non-removable, volatile/non-volatile computer storage media. By way of example, FIG. 7 shows a mass storage device 604 which may provide non-volatile storage of computer code, computer readable instructions, data structures, program modules, and other data for the computing device 601. For example and not limitation, a mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 604, including by way of example, an operating system 605 and video processing software 606. Each of the operating system 605 and video processing software 606 (or some combination thereof) may comprise elements of the programming and the video processing software 606. Video processing data 607 may be stored on the mass storage device 604. Video processing data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 601 via an input device (not shown). Examples of such input devices may comprise, but are not limited to, a keyboard, pointing device (e.g., a "mouse"), a microphone, a joystick, a scanner, tactile input devices such as gloves, and other body coverings, and the like These and other input devices may be connected to the processing unit 603 via a human machine interface 602 that is coupled to the system bus 613, but may be connected by other interface and bus structures, such as a parallel port, game port, an IEEE 1394 Port (also known as a Firewire port), a serial port, or a universal serial bus (USB).

A display device 611 may be connected to the system bus 613 via an interface, such as a display adapter 609. It is contemplated that the computing device 601 may have more than one display adapter 609 and the computing device 601 may have more than one display device 611. For example, a display device may comprise a monitor, an LCD (Liquid Crystal Display), or a projector. In addition to the display device 611, other output peripheral devices may comprise components such as speakers (not shown) and a printer (not shown) which may be connected to the computing device 601 via Input/Output Interface 610. Any step and/or result of the methods may be output in any form to an output device. Such output may comprise any form of visual representation, including, but not limited to, textual, graphical, animation, audio, tactile, and the like. The display device 611 and computing device 601 may comprise part of one device, or separate devices.

The computing device 601 may operate in a networked environment using logical connections to one or more remote computing devices 614*a,b,c*. By way of example, a remote computing device may comprise a personal computer, portable computer, a smart phone, a server, a router, a network computer, a peer device or other common network node. Logical connections between the computing device 601 and a remote computing device 614*a,b,c* may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are shown herein as discrete blocks, although such programs and components may reside at various times in different storage components of the computing device 601, and may be executed by the data processor(s) of the computer. An implementation of video processing software 606 may be stored on or transmitted across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
   determining a splitting parameter associated with a partitioning of at least a portion of a first frame of a plurality of frames of video content, wherein the splitting parameter comprises an indication of a complexity of the at least the portion of the first frame of the plurality of frames; and
   deblock filtering the first frame of the plurality of frames, wherein a strength of the filtering is based on the splitting parameter, and wherein a higher complexity of the at least the portion of the first frame results in a lower strength of the deblock filtering.

2. The method of claim 1, wherein the strength of the filtering is further based on a quantity of splits of the at least the portion of the first frame of the plurality of frames.

3. The method of claim 1, wherein the strength of the filtering is further based on a texture of the at least the portion of the first frame of the plurality of frames.

4. The method of claim 2, wherein the quantity of splits comprises a split of a coding unit (CU) of the at least the portion of the first frame of the plurality of frames.

5. The method of claim 2, wherein the quantity of splits comprises at least one of a vertical binary split, a horizontal binary split, a vertical ternary split, or a horizontal ternary split.

6. The method of claim 1, wherein the partitioning of the at least the portion of the first frame of the plurality of frames comprises determining a multi-tree type (MTT) structure.

7. The method of claim 1, further comprising:
encoding the first frame of the plurality of frames, wherein the encoding the first frame of the plurality of frames comprises the partitioning of the at least the portion of the first frame of the plurality of frames.

8. The method of claim 7, wherein the encoding the first frame of the plurality of frames comprises the filtering based at least on the splitting parameter and using the deblock filter, the first frame of the plurality of frames.

9. The method of claim 1, wherein the splitting parameter further comprises an indication of a split type associated with the partitioning of the at least the portion of the first frame of the plurality of frames.

10. The method of claim 9, wherein the split type comprises at least one of a vertical binary split type, a horizontal binary split type, a vertical ternary split type, or a horizontal ternary split type.

11. A non-transitory computer-readable medium storing instructions that when executed, cause:
determining a splitting parameter associated with a partitioning of at least a portion of a first frame of a plurality of frames of video content, wherein the splitting parameter comprises an indication of a complexity of the at least the portion of the first frame of the plurality of frames; and
deblock filtering the first frame of the plurality of frames, wherein a strength of the filtering is based on the splitting parameter, and wherein a higher complexity of the at least the portion of the first frame results in a lower strength of the deblock filtering.

12. The non-transitory computer-readable medium of claim 11, wherein the strength of the filtering is further based on a quantity of splits of the at least the portion of the first frame of the plurality of frames.

13. The non-transitory computer-readable medium of claim 11, wherein the strength of filtering is further based on a texture of the at least the portion of the first frame of the plurality of frames.

14. The non-transitory computer-readable medium of claim 12, wherein the quantity of splits comprises a split of a coding unit (CU) of the at least the portion of the first frame of the plurality of frames.

15. The non-transitory computer-readable medium of claim 12, wherein the quantity of splits comprises at least one of a vertical binary split, a horizontal binary split, a vertical ternary split, or a horizontal ternary split.

16. The non-transitory computer-readable medium of claim 11, wherein the partitioning of the at least the portion of the first frame of the plurality of frames comprises determining a multi-tree type (MTT) structure.

17. The non-transitory computer-readable medium of claim 11, wherein the instructions, when executed, further cause:
encoding the first frame of the plurality of frames, wherein the encoding the first frame of the plurality of frames comprises the partitioning of the at least the portion of the first frame of the plurality of frames.

18. The non-transitory computer-readable medium of claim 17, wherein the encoding the first frame of the plurality of frames comprises the filtering based at least on the splitting parameter and using the deblock filter, the first frame of the plurality of frames.

19. The non-transitory computer-readable medium of claim 11, wherein the splitting parameter further comprises an indication of a split type associated with the partitioning of the at least the portion of the first frame of the plurality of frames.

20. The non-transitory computer-readable medium of claim 19, wherein the split type comprises at least one of a vertical binary split type, a horizontal binary split type, a vertical ternary split type, or a horizontal ternary split type.

21. A device comprising:
one or more processors; and
memory storing instructions that, when executed by the one or more processors, cause the device to:
determine a splitting parameter associated with a partitioning of at least a portion of a first frame of a plurality of frames of video content, wherein the splitting parameter comprises an indication of a complexity of the at least the portion of the first frame of the plurality of frames; and
deblock filter the first frame of the plurality of frames, wherein a strength of the filter is based on the splitting parameter, and wherein a higher complexity of the at least the portion of the first frame results in a lower strength of the deblock filter.

22. The device of claim 21, wherein the strength of the filter is further based on a quantity of splits of the at least the portion of the first frame of the plurality of frames.

23. The device of claim 21, wherein the strength of the filter is further based on a texture of the at least the portion of the first frame of the plurality of frames.

24. The device of claim 22, wherein the quantity of splits comprises a split of a coding unit (CU) of the at least the portion of the first frame of the plurality of frames.

25. The device of claim 22, wherein the quantity of splits comprises at least one of a vertical binary split, a horizontal binary split, a vertical ternary split, or a horizontal ternary split.

26. The device of claim 21, wherein the partitioning of the at least the portion of the first frame of the plurality of frames comprises determining a multi-tree type (MTT) structure.

27. The device of claim 21, wherein the instructions, when executed by the one or more processors, further cause the device to:
encode the first frame of the plurality of frames, wherein the encoding the first frame of the plurality of frames comprises the partitioning of the at least the portion of the first frame of the plurality of frames.

28. The device of claim 27, wherein the encoding the first frame of the plurality of frames comprises the filtering based at least on the splitting parameter and using the deblock filter, the first frame of the plurality of frames.

29. The device of claim 21, wherein the splitting parameter further comprises an indication of a split type associated with the partitioning of the at least the portion of the first frame of the plurality of frames.

30. The device of claim 29, wherein the split type comprises at least one of a vertical binary split type, a horizontal binary split type, a vertical ternary split type, or a horizontal ternary split type.

* * * * *